UNITED STATES PATENT OFFICE.

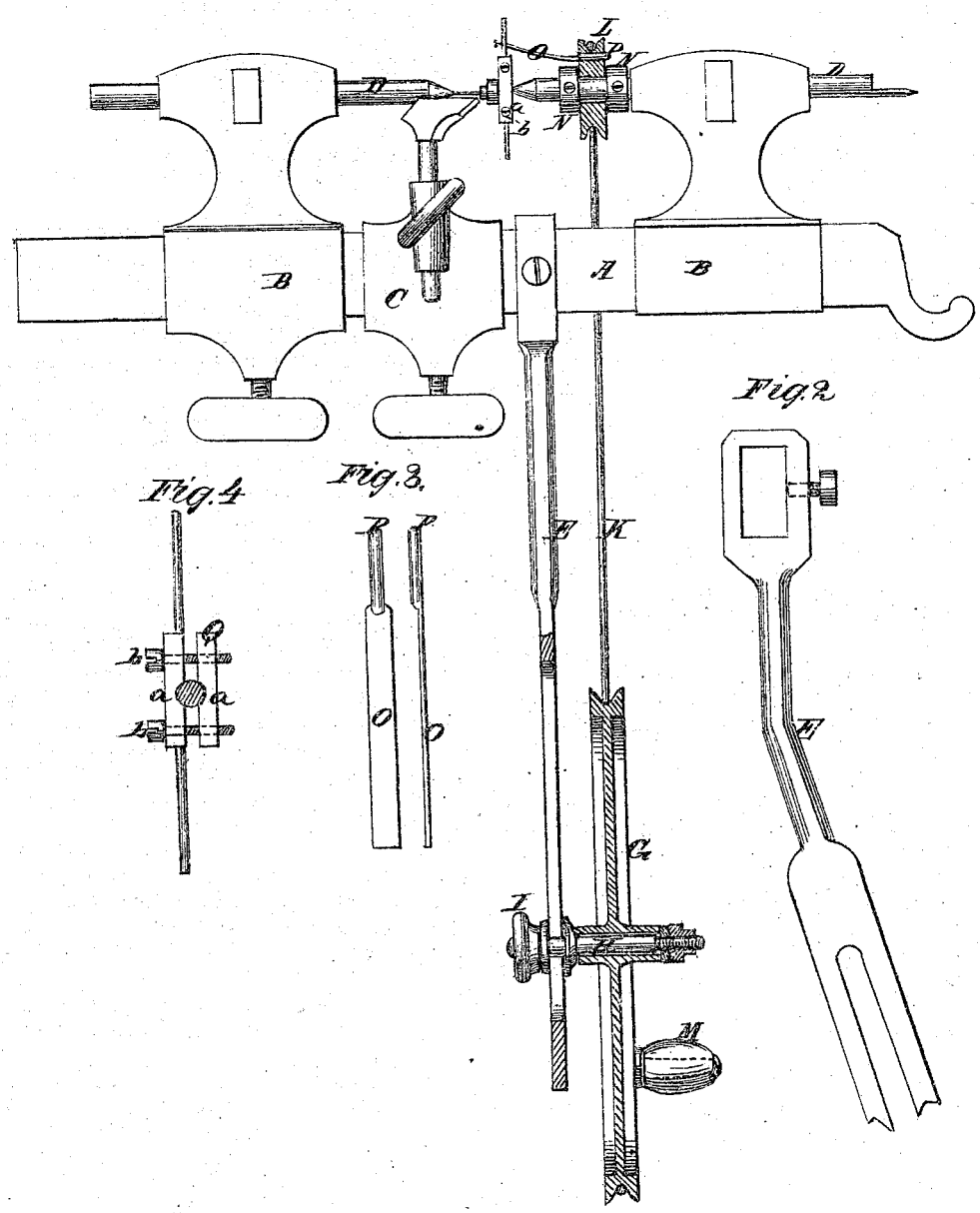

GASPAR HUNZIKER, OF SUMMIT, MISSISSIPPI.

IMPROVEMENT IN WATCH-MAKERS' LATHES.

Specification forming part of Letters Patent No. 122,768, dated January 16, 1872.

Specification describing a certain Improved Watch-Maker's Lathe, invented by GASPAR HUNZIKER, of Summit, in the county of Pike and State of Mississippi.

My invention pertains to an improvement in lathes for watch-makers' use whereby certain advantages are attained, as hereinafter specified.

Figure 1 is a side elevation of my improved lathe, with the driving-wheel and a part of its support sectioned. Fig. 2 is a side elevation of the driving-wheel supporting-arm. Fig. 3 represents the "carrying-pin" in two side views, and Fig. 4 is a side elevation of the dog, and the end of a piece of work confined in it.

Similar letters of reference indicate corresponding parts.

A is the beam; B, the spindle-support; C, the tool-support, and D, the spindles or broaches, such as commonly used in a watch-maker's lathe. I propose to apply the pendent arm E, with a slot, F, in the lower end, to the beam, so that it can slide back and forth, or be adjusted on said beam, and secured by a set-screw, and on this arm I mount a grooved driving-pulley, G, on a stud-pin, H, which is clamped to the flattened and slotted lever portion of the arm by a thumb-screw, I, in such manner that the wheel can be readily adjusted up or down, as required, by the length of the cord K used for driving the pulley L. This wheel will have a pin or handle, M, for turning it to revolve the pulley.

The beam being supported in a stand of any kind, as the beams of this class of lathes commonly are, will support the wheel G, a short distance below it, in a position where it will be more convenient for turning the pulley by a continuous rotary motion than it is to turn it by the bow commonly used, thus enabling me to have the continuous rotary motion with less labor than is required to produce the back-and-forth motion of the bow, which is very objectionable; and the supporting-arm E, being adjustable on the beam, makes it convenient for any kind of work, and removes all objection to the use of a driving-pulley on the score of inconvenience.

I propose to mount the pulley L loosely on the spindle D, between the adjustable collars N, to allow of adjusting the spindle as demanded by the nature of the work in hand, and retaining the pulley in line with the driver.

To turn the work I employ a bar or carrying-pin, which I make with a round shank, P, fitting the hole in the pulley, and a flat springing part, O, to bear against the dog Q, using the flat side against the dog when the work is light; and it is desirable to take great care not to break it, so that if the tool catches or other obstruction arises the carrier will spring past the dog, but when such care is not necessary the edge may be placed against the dog. This dog, which is composed of the two clamping-blocks, a, and connecting-screws b, may have one of the parts a extended considerably, to be acted on by the carrier, and it may be made so as to spring if the work is obstructed.

Having thus described my invention, I claim as new and desire to secure by Letters Patent—

1. The carrying-pin O P, pulley L, and work-holder Q, or its equivalent, as and for the purpose specified.

2. In combination with the subject-matter of the foregoing claim, the collars N N, adjustable arm E, pulley G, and band K.

GASPAR HUNZIKER.

Witnesses:
G. T. BUNCH,
A. L. ALLISON,
H. MURRAY QUIN.

(100)